United States Patent [19]

Dahl et al.

[11] Patent Number: 5,238,064

[45] Date of Patent: Aug. 24, 1993

[54] SQUEEZE CEMENTING

[75] Inventors: Jeffrey A. Dahl; E. Dwyann Dalrymple; James R. Stanford, all of Duncan, Okla.

[73] Assignee: Hallinburton Company, Duncan, Okla.

[21] Appl. No.: 862,864

[22] Filed: Apr. 3, 1992

Related U.S. Application Data

[63] Continuation-in-part of Ser. No. 638,718, Jan. 8, 1991, Pat. No. 5,121,795.

[51] Int. Cl.$^5$ .......................................... E21B 33/138
[52] U.S. Cl. ..................................... 166/293; 166/285
[58] Field of Search ........................ 166/285, 292, 293; 106/713, 714, 737

[56] References Cited

U.S. PATENT DOCUMENTS

| | | |
|---|---|---|
| 3,689,294 | 9/1972 | Braumanauer . |
| 3,809,665 | 5/1974 | Allemand et al. . |
| 3,819,389 | 6/1974 | Uchikawa et al. . |
| 3,883,361 | 5/1975 | Pollitt . |
| 3,904,568 | 9/1975 | Yamaguchi et al. . |
| 3,923,534 | 12/1975 | Cassidy . |
| 4,054,460 | 10/1977 | Buchet et al. . |
| 4,126,003 | 11/1978 | Tomic ............................ 405/261 |
| 4,126,005 | 11/1978 | Coursen .......................... 405/261 |
| 4,127,001 | 11/1978 | Tomic ............................ 405/261 |
| 4,160,674 | 7/1979 | Sawyer . |
| 4,174,227 | 11/1979 | Tomic . |
| 4,242,142 | 12/1980 | Gee et al. . |
| 4,302,251 | 11/1981 | Udagawa et al. . |
| 4,306,910 | 12/1981 | Miyoshi et al. . |
| 4,306,912 | 12/1981 | Forss . |
| 4,342,599 | 8/1982 | Mann et al. . |
| 4,350,533 | 9/1982 | Galer et al. . |
| 4,353,746 | 10/1982 | Birchall et al. . |
| 4,353,747 | 10/1982 | Birchall et al. . |
| 4,402,749 | 9/1983 | Hall et al. . |
| 4,415,364 | 11/1983 | Naito et al. . |
| 4,443,260 | 4/1984 | Miyoshi et al. . |
| 4,487,632 | 12/1984 | Sherif et al. . |
| 4,505,752 | 3/1985 | Sherif et al. . |
| 4,545,797 | 10/1985 | Elattar . |
| 4,551,176 | 11/1985 | Skvara et al. . |
| 4,557,763 | 12/1985 | George et al. . |
| 4,619,702 | 10/1986 | Gartner . |
| 4,681,634 | 7/1987 | Roca et al. . |
| 4,761,183 | 8/1988 | Clarke . |
| 4,781,760 | 11/1988 | Svensson et al. . |
| 4,897,119 | 1/1990 | Clarke . |
| 5,071,484 | 12/1991 | Bonifay et al. ..................... 106/692 |

FOREIGN PATENT DOCUMENTS

| | | |
|---|---|---|
| 0097513 | 4/1984 | European Pat. Off. . |
| 2228791 | 12/1973 | Fed. Rep. of Germany . |
| 1038315 | 11/1980 | U.S.S.R. . |
| 1160569 | 8/1969 | United Kingdom . |
| 2018737 | 10/1979 | United Kingdom . |

OTHER PUBLICATIONS

Smith, Cementing, "The Manufacture, Chemistry and Classification of Oil Well Cements", 1987, p. 15.
William J. Clarke, Performance Charateristics of Microfine Cement, May 14, 1984; pp. 1-14, ASCE 84-023.
William J. Clarke, Microfine Cement Technology, Dec. 6-9, 1987, 23rd International Cement Seminar, pp. 1-13.
Geo/Chem, MC-500 Microfine Cement, pp. 1-25, Feb. 2, 1984.
Alfred Brand, Paul Blakita, William Clarke, Microfine Cement Grout Supports Brooklyn Tunneling; Civil Engineering EDC ASCE, Jan. 1988, vol. 58, No. 1.
Halliburton Servcies Cementing Technical Data C-1375, Mar. 1990.
Advertisement, Oil & Gas Journal, Oct. 1990.
Matrix Cement Case Histories #9217, Nov. 1990.
Matrix Cement 200× magnification, Nov. 1990.
Advertisement, Oil & Gas Journal Jan. 1991, Matrix Cement.
Halliburton Services Cementing Technical Paper C-13184, Apr. 1990, Ewert, et al.
Temporary Technical Data Sheet-Matrix Cement Aug. 1989.

*Primary Examiner*—George A. Suchfield
*Attorney, Agent, or Firm*—Thomas R. Weaver

[57] ABSTRACT

This invention relates to a method of terminating the undesirable flow of water from a highly permeable portion of a portion of or a fracture in a subterranean formation into a wellbore, which method involves the use of a hydraulic cement consisting of discrete particles having a particle size not greater than about 30 microns. The cement, which is utilized in a slurry of a hydrocarbon liquid and a surfactant, has a low density, good thixotropic properties and, in one embodiment, expansive characteristics.

13 Claims, No Drawings

SQUEEZE CEMENTING

CROSS REFERENCE TO RELATED APPLICATION

This is a continuation-in-part of prior copending application Ser. No. 638,718 filed Jan. 8, 1991, which is now U.S. Pat. No. 5,121,795.

BACKGROUND OF THE INVENTION

1. Field of the Invention

This invention relates to wells used in the introduction of fluids into and the recovery of fluids from subterranean formations. It further relates to the use of hydraulic cement compositions to construct and repair such wells. This invention particularly relates to methods of using a very finely divided hydraulic cement composition to construct and repair such wells.

2. Problems Solved

In the operation of wells used in the recovery of fluids from or the introduction of fluids into subterranean formations problems relating to the unwanted passage of fluids and/or fine solids into or from undesirable locations in the formation or wellbore sometimes occur. This unwanted passage of fluids and/or fine solids can severely disrupt or in fact terminate the desired operation of a well.

To be more specific, the problems involving unwanted passage of fluids, referred to above, ordinarily involve the movement of fluids, such as oil, gas or water through very small undesirable openings. These problems are not unique and the solutions have traditionally involved apparatus, methods and compositions adapted to cover, seal or to otherwise plug the openings to thereby terminate the unwanted passage of fluid through the opening. The openings referred to above include: holes or cracks in well casing; spaces such as holes, cracks, voids or channels in the cement sheath deposited in the annular space between the formation face and well casing; very small spaces—called microannuli—between the cement sheath, referred to above, and the exterior surface of the well casing or formation; and permeable spaces in gravel packs and formations.

It is clear that holes or cracks in well casing and/or cement sheath can permit the unwanted and therefore uncontrolled passage of fluid therethrough. Sometimes, of course, holes are deliberately made in casing and sheath by a known process called perforating in order to permit the controlled recovery of fluid from a formation or to permit the controlled introduction or injection of fluid into a formation. The sealing or plugging of such holes or cracks, whether or not made deliberately, has been conducted by attempts to place or otherwise force a substance into the hole or crack and permitting it to remain therein to thereby plug the opening. Naturally, the substance will not plug the opening if it will not enter the opening. If the substance does not fit then, at best, a bridge, patch, or skin may be formed over the opening to produce, perhaps, a temporary termination of the unwanted fluid flow.

Substances used in methods to terminate the unwanted passage of fluids through holes or cracks in casing and/or sheath have been compositions comprised of hydraulic cement, wherein the methods employ hydraulic pressure to force a water slurry of the cement into the cracks and holes wherein the cement is permitted to harden. These methods are variously referred to in the art as squeeze cementing, squeezing or as squeeze jobs. The success of squeezing hydraulic cement into such holes and cracks is among other factors a function of the size of the hole relative to the particle size of the cement as well as the properties of the slurry. As mentioned earlier, if the particle size of the cement is greater than the crack width, the cement will not enter and at best a patch instead of a plug is the result. A problem therefore is to substantially reduce cement particle size without reducing the hardening and strength characteristics of hydraulic cement.

During the construction of a well it is known to place a volume of a water slurry of a hydraulic cement into the annular space between the walls of the borehole and the exterior of the casing wherein the cement is permitted to solidify to thereby form an annular sheath of hardened cement. The objective of the sheath, the construction of which is referred to as primary cementing, includes physical support and positioning of the casing in the borehole and prevention of unwanted fluid (liquid and gas) migration between various formations penetrated by the wellbore. If, for some reason, the hardened sheath contains spaces such as voids, cracks or channels due to problems involved in the placement of the slurry it is clear that the sheath may not be capable of providing the desired objectives. Accordingly, by employing known techniques to locate the voids, channels or cracks, a perforation penetrating the spaces can be made in the casing and sheath and cement then squeezed into the spaces via the perforation so as to place the sheath in a more desirable condition for protecting and supporting the casing and providing fluid flow control. As mentioned earlier, the success of the squeeze job is at least a function of the size of the space or spaces to be filled relative to the particle size of the cement.

Another problem incidental to the formation of the cement sheath, referred to above, revolves about the occasional failure of the sheath to tightly bond to the exterior wall of the casing or the interior of the borehole. This failure can produce a very thin annular space called a microannulus between the exterior wall of the casing and the sheath or the sheath and the borehole. For the reasons already discussed, it is important to place a substance, such as a hydraulic cement, in the microannulus to enable the sheath to fully provide the intended benefits. Again, as stated above, the success of squeezing cement into a microannulus space is dependent upon the relative size of the space and the particle size of the cement.

The solid portions of some producing formations are not sufficiently stable and therefore tend to break down into small pieces under the influence of the pressure difference between the formation and the wellbore. When fluid, such as oil or water, flows under the influence of the pressure difference from the formation to the wellbore the small pieces referred to above can be carried with the fluid into the wellbore. Over a period of time, these pieces can build up and eventually damage the well and associated equipment and terminate production. The art has solved this problem by placing in the wellbore a production aid which is referred to in the art as a gravel pack. A gravel pack is usually comprised of a mass of sand within the interior of a well. The sand bed completely surrounds a length of tubular goods containing very narrow slots or small holes; such goods are sometimes referred to as slotted liners or sand screens. The slots or holes permit the flow of fluid therethrough but are too narrow to permit the passage of the sand. The slotted liner or sand screen can be connected through a packer situated up-hole of the gravel pack to production tubing extended from the wellhead. The gravel pack ordinarily consists of siliceous material having sand grains in the range of from about 10 to about 100 mesh.

The gravel pack, which can be situated in the casing in the perforated interval, traps the small pieces of formation material, for convenience herein referred to as formation fines or sand, which flows from the formation with the fluid through the perforations and into the gravel pack. Accordingly, neither formation sand nor gravel pack sand penetrates the slotted tubing and only fluid is permitted to pass into the tubular goods.

The above expedient performs nicely until undesired fluid begins to penetrate the gravel pack from the formation. At that point the flow of undesired fluid, such as water, must be terminated preferably in a way which will not necessitate removal of the gravel pack. This invention permits such an objective.

The problems referred to above uniformly deal with the unwanted passage of materials into or from very small undesirable openings in a well, including the cement sheath constructed during a primary cementing procedure. Solution of these problems, according to this invention, all involve a remedial or repair operation featuring the use of a very finely divided hydraulic cement. Still another problem involved in the construction and repair of wells involves the primary cementing procedure itself.

Primary cementing, as was described above, is conducted during the construction of a well and involves the placement of a volume of a slurry of a hydraulic cement in water into the annular space between the walls of the borehole and the exterior of primary casings such as conductor pipe, surface casing, and intermediate and production strings. The slurry is permitted to solidify in the annulus to form a sheath of hardened cement the purpose of which is to provide physical support and positioning of the casing in the borehole and to isolate various formations penetrated by the borehole one from another.

A problem encountered during primary cementing is centered upon the weight (that is the density) of the slurry itself. In certain circumstances the hydrostatic pressure developed by a column of slurry overcomes the resistance offered by a formation in which case the formation fractures or otherwise breaks down with the result that a portion of the slurry enters the formation and the desired sheath is not formed. The formation breakdown thus occurs prior in time to development of sufficient rigidity or hardening of the cement to enable it to be self-supporting.

One solution has been to reduce the density of the slurry so that the pressure developed by the required slurry height will not exceed the ability of the formation to resist breakdown. This expedient can result in sheaths having physical deficiencies such as reduced strength or increased permeability or both. Another solution has been to reduce the weight of the slurry while maintaining density by reducing the quantity of slurry pumped in a single lift or stage to thus reduce the height of slurry. This expedient requires several separate stages in order to produce the required sheath length. Time must pass between stages in order to permit previous stages to develop strength sufficient to support the weight of succeeding stages. The time expended waiting on cement to set is lost time in the process of constructing the well.

The use of the finely divided hydraulic cement of this invention solves the primary cementing problems referred to above.

Still another problem involved in the operation of wells which are the subject of this invention, revolves about the unwanted movement of water via cracks and fractures in the subterranean formation—whether naturally occurring or deliberately produced—from the formation into the wellbore. Terminating this water movement may require remedial efforts other than those referred to previously which feature plugging perforations, holes, cracks and the like in casing, cement sheath and gravel packs—all of which occur within the confines of the well borehole itself.

The unwanted movement of water from cracks and fractures in the formation outside of the well borehole itself may be prevented by use of the hydraulic cement composition of this invention.

DISCLOSURE OF THE INVENTION

The solutions to the problems discussed above broadly relate: to remedial cementing operations conducted inside a wellbore; to remedial cementing operations conducted outside a wellbore in a subterranean formation; and to primary cementing operations conducted during construction of a well. The solutions to these problems, according to this invention, basically feature the practice of well cementing methods long accepted for confronting and solving these problems with one substantial change. The substantial change in the methods comprises the uniform use in the accepted methods of a hydraulic cement, as defined below, consisting of discrete particles of cementitious material having diameters no larger than about 30 microns, preferably no larger than about 17 microns, and still more preferably no larger than about 11 microns. The distribution of various sized particles within the cementitious material, i.e., the particle size distribution, features 90 percent of them having a diameter not greater than about 25 microns, preferably about 10 microns and still more preferably about 7 microns, 50 percent having a diameter not greater than about 10 microns, preferably about 6 microns and still more preferably about 4 microns and 20 percent of the particles having a diameter not greater than about 5 microns, preferably about 3 microns and still more preferably about 2 microns.

The particle size of hydraulic cement can also be indirectly expressed in terms of the surface area per unit weight of a given sample of material. This value, sometimes referred to as Blaine Fineness or as specific surface area, can be expressed in the units square centimeters per gram ($cm^2$/gram) and is an indication of the ability of a cementitious material to chemically interact with other materials. Reactivity is believed to increase with increase in Blaine Fineness. The Blaine Fineness of the hydraulic cement used in the cementing methods of this invention is no less than about 6000 $cm^2$/gram. The value is preferably greater than about 7000, more preferably about 10,000, and still more preferably greater than about 13,000 $cm^2$/gram.

Cementitious materials of particle size and fineness as set out above are disclosed in various prior U.S. patents including U.S. Pat. No. 4,761,183 to Clark, which is drawn to slag, as defined herein, and mixtures thereof with Portland cement, and U.S. Pat. No. 4,160,674 to Sawyer, which is drawn to Portland cement. The cementitious materials preferred for use in this invention are Portland cement and combinations thereof with slag wherein the quantity of Portland cement included in any mixture of Portland cement and slag used in the methods of this invention can be as low as 10 percent but is preferably no less than about 40 percent, more preferably about 60 percent, still more preferably about 80 percent and most preferably no less than about 100% Portland cement by weight of mixture.

Some of the problems solved by this invention require the use of a cementitious material of very small particle size to enable passage thereof through very narrow openings and penetration thereof into low permeability gravel packs and formations. To solve other problems described above, the material when slurried in water must exhibit a sufficiently low slurry density to enable use in situations requiring a light-weight cement which nevertheless develops satisfactory high compressive strength. In this regard the large surface area of the cement of this invention, i.e., the Blaine Fineness, renders it more reactive than cements of lower Blaine Fineness; accordingly, quantities of water greater than quantities usually employed in well cementing operations may be employed to thereby enable the formulation of slurries of low density and low viscosity without unsatisfactory loss in strength.

Thus, slurries useful herein can be formulated utilizing ratios of the weight of water per unit weight of cementitious material in the range of from about 0.5 to about 5.0, preferably from about 1.0 to about 1.75 and still more preferably from about 1.00 to about 1.5 pounds water per pound of cementitious material. Water to cement ratios in excess of about 1.75 and up to about 5.0 can be formulated for highly specialized applications requiring slurries of very low density and very low viscosity. It is noted, however, that slurries having such high water ratios tend to exhibit free water separation and excessive solids settling. Additives can be utilized to control free water separation and solids settling.

The slurry densities of the fine, i.e., low particle size, cements of this invention are lower than cements having usual particle sizes because of the high water ratios required to wet all of the surface area of the fine cement. The compressive strengths, however, of the set lower density slurries are satisfactory for both primary cementing and penetration cementing purposes especially in view of the greater reactivity of the fine cements. Also, and particularly in the case of slurries formulated at high water ratios, where penetration into very small holes, cracks and openings is the goal, water may indeed be eventually forced out of the fine penetrating particles to thereby deposit in the target crack, opening or porosity a dense, high-strength and highly water impermeable mass of set cement.

Considering the range of water-to-cement ratios disclosed above, the slurries which can be formulated utilizing the fine cement of this invention have densities in the range of from about 9.4 to about 14.9, preferably from about 11.0 to about 12.5 and still more preferably in the range of from about 11.5 to about 12.5 pounds of slurry per gallon of slurry.

One particular advantage, in addition to the low slurry densities available herein, is that the high water ratios produce low heats of hydration. Thus, the fine particle size hydraulic cement of this invention is quite useful when conducting cementing operations, and particularly primary cementing operations, adjacent to structures which may undergo undesired physical breakdown in the presence of produced heat. Examples of such structures include permafrost and gas hydrate zones.

Still another particular advantage accruing from using the fine particle size Portland cement of this invention is the observed unexpected expansion of the cement during setting. This expansion property can help prevent the formation of microannuli—when the cement is used in primary cementing operations—and can help the formation of very tightly fitting plugs—when the cement is used in squeeze cementing.

It is believed that this desirable expansive feature of the fine particle size Portland cement is due to the chemical content thereof and particularly to the high concentration of crystalline tricalcium aluminate ($C_3A$) and sulfates present therein. See, for example, Table VII. It is thought that a Portland cement having a maximum particle size of about 11 microns, a Blaine Fineness of preferably greater than about 10,000 $cm^2$/gram, a $C_3A$ crystalline content of preferably about 3.0 percent or more and a sulfate content of preferably about 1.0 percent or more will exhibit expansive characteristics desirable in an oil field cement.

Slurries of water and the fine particle size cement of this invention, as previously mentioned, are very useful to penetrate, fill and harden in fine holes, cracks and spaces such as might be expected to be found in well casing, cement sheaths, gravel packs and subterranean formations in the vicinity of a well bore. By way of example, it is believed that such slurries are useful to penetrate subterranean formations having effective permeabilities as low as about 3000 to about 5000 millidarcies. Accordingly, a condition known as water coning, in which water from a subterranean formation enters the wellbore in a rising or coning fashion, can be terminated by squeezing a slurry of fine particle size cement of this invention into formations producing such water, wherein the formations to be penetrated can have effective permeabilities as low as 3000 to 5000 millidarcies.

In addition, a water slurry of the fine particle size cement of this invention can be utilized to terminate the unwanted flow of water through a zone in a gravel pack. In this regard such a slurry can be formulated to permeate and set in a gravel pack consisting of a packed sand bed wherein the sand in the pack has a particle size as low as 100 mesh (about 150 micron). Such a procedure can be utilized to plug channels in gravel packs created by flowing steam as well as by flowing water.

Still further, a water slurry of the fine particle size cement of this invention can be formulated to penetrate, plug and set in fine cracks in well pipe and in channels and microannulus spaces in and around the cement sheath wherein such fine cracks can be as narrow as about 0.05 millimeters (0.002 inches).

With regard to the above uses—but without being bound by the following slurry design aid—it is considered for commercial design purposes that a particle of given size in a suitable slurry as described herein can penetrate, fill and set in a crack, hole or void having a size of approximately 5 times greater than the size of the particle. Thus the 0.05 millimeter (50 micron) crack referred to above can be penetrated by a slurry of particles having a size of about 10 microns which is within the scope of the cement of this invention.

It was mentioned previously that the rate of hardening of the fine cement of this invention is related to the Blaine Fineness wherein the hardening rate increases as Blaine Fineness increases. In addition, the hardening rate is also related to the specific cementitious material being used and the temperature of the environment wherein the hardening reaction is proceeding. Thus fine particle size Portland cement, as hereinafter defined, hardens more rapidly in low temperature environments in the range of from about 30° F. to about 100° F. than does fine particle size slag cement, also as hereinafter defined. Also Portland cement hardens more rapidly at elevated temperatures than does slag cement.

Accordingly, to adjust to specific environments, specific slurries of fine cement can include mixtures of Portland cement and slag consistent with the concentrations previously disclosed. In general, longer set times can be achieved by increasing slag content with accompanying decrease in compressive strength and/or increasing slurry density or both.

In addition the usual well cementing additives can be combined with the cementitious materials of this invention to achieve the usual results. For example, to assist in the dispersion of individual cementitious particles in a slurry and thus to help prevent the formation of large particles by agglomeration or lumping a dispersing agent may be added to a water slurry of the cement of this invention in an amount effective to produce adequate dispersion. Such an effective amount is considered to include amounts up to about 1.5 parts by weight dispersant per 100 parts by weight of cementitious material. One such dispersant is identified by the name CFR-3 and another by the name Halad-322 each of which is disclosed and claimed in U.S. Pat. No. 4,557,763 to George, et al., the disclosure of which is incorporated herein by reference. In view of a principle object of this invention to provide a slurry of particles which will enter very small openings and still develop adequate compressive strength the use of a material to help assure particle dispersion is considered to be an important aspect of the invention.

Other additives commonly used in well cementing which may be utilized herein include defoaming agents, fluid loss additives, lost circulation additives, expansion additives, hardening accelerators (although, not normally required) and hardening retarders which may be particularly useful when high temperature environments are encountered. Portland cements having the small particle sizes required in this invention may require retardation of set time at elevated temperatures. Accordingly, conventional lignosulfonates are considered to be useful to achieve sufficient retardation. Still other additives may be utilized to still further decrease the slurry density of the cement composition of this invention. Such lightweight additives include nitrogen, perlite, fly ash, silica fume, microspheres and the like. It is believed that a combination of fine particle size cement, water and additives can produce a competent slurry having a density of as low as about 9 pounds per gallon which will achieve compressive strength sufficient for oil field operations.

When well cementing environments exhibit high temperatures, e.g. about 230° F. or more, it may be necessary to combine with the slurry a material which will help prevent the loss of compressive strength of set cement over time—a condition referred to as compressive strength retrogression. In one specific embodiment, a cement placed in a cased hole adjacent a geothermal formation or a formation into which steam will be introduced can be subjected to temperatures of up to about 600° F. Such extremely high temperatures can produce a loss in compressive strength of set cement; however, by using the fine particle size, preferably Portland, cement of this invention in combination with Silica Flour, a crystalline form of silicon dioxide ($SiO_2$), compressive strength retrogression can be prevented or at least reduced in magnitude. This material is added to the slurry in an amount effective to react with the hydraulic cement to help prevent the development of compressive strength retrogression. It is believed that such an effective amount is in the range of from about 0.15 to about 1.0 and preferably about 0.35 pounds silica flour per pound of hydraulic cement.

Still another advantage of this invention in addition to light weight slurries, low viscosity, good compressive strength, and small particle size are the thixotropic properties displayed by the slurry. Accordingly, with a slurry preferably consisting solely of small particle size Portland cement used in primary cementing operations, the thixotropic properties help prevent unwanted fluid migration, especially unwanted gas migration, during the time when the cement is in an unset plastic condition.

Subterranean formations sometimes produce unwanted water from natural fractures as well as from fractures produced by forces applied deliberately or accidentally during production operations. It is known that such fractures provide a path of least resistance to the flow of fluid from a formation to a wellbore. When the fluid flowing in a fracture is primarily oil, the fracture is considered to be beneficial and thus desirable; however, when the fluid flowing in the fracture from the formation to the wellbore is primarily water the fracture is considered to be a problem and thus undesirable. By the method of this invention the undesirable fracture can be filled with fine cement to plug it and thereby terminate the flow of fluid therein.

The fine particle size cement of this invention can be placed into a subterranean fracture as well as into a high permeability zone of the formation by the application of conventional procedures. The cement itself, although it is highly reactive due to its small particle size, can be rendered temporarily nonreactive by preventing contact between it and water prior in time to actual placement of the cement into the fracture. Accordingly the fine cement of this invention is dispersed in a relatively low viscosity, relatively non-volatile liquid hydrocarbon, such as diesel oil, to form a pumpable slurry of cement in oil. (See U.S. Pat. No. 4,126,003 to Tomic).

The dispersion of the cement in the non-volatile liquid hydrocarbon must be assisted by use of an appropriate surfactant, which is hereinafter more fully described. In this regard it has been discovered that a mixture of the fine cement of this invention with the liquid hydrocarbon, in the absence of a surfactant, produces a blend having a viscosity so high that the blend cannot be pumped by conventional means into the desired location in the formation. Use of the surfactant, as described below, results in a blend of cement in hydrocarbon having a sufficiently low viscosity to permit convenient conventional introduction of the blend into the desired location in the formation.

Furthermore, it has also been discovered that the high beneficial hydraulic activity of the fine particle size cement of this invention can be unduly reduced upon contact with a hydrocarbon, but that the problem can be avoided by use of the hereinafter further described surfactant.

Thus, the use of a surfactant is necessary to enable the production of a cement in hydrocarbon slurry having a sufficiently low viscosity to permit convenient placement in the desired zone, and to prevent the liquid hydrocarbon carrier from oil wetting the surface of the small particle size cement because such oil wetting would cause the fine cement to suffer a loss of hydraulic activity. The slurry is then introduced into the fracture.

After the slurry of cement and oil is in the fracture, water flowing in the fracture slowly contacts the cement to thereby render the cement reactive so as to initiate hydration, hardening and ultimate formation of a permanent plug in the fracture. By this technique the cement in the hydrocarbon/surfactant/cement slurry will only set when contacted by water in the fracture and thus will not set if the slurry enters a fracture containing oil. Accordingly, oil producing portions of a reservoir will remain relatively damage free.

As mentioned above, successful formulation of a cement in hydrocarbon oil slurry to obtain the goals set out above depends upon sufficient dispersion of the cement in the oil. In this regard, such a dispersion is obtained by combining a hydrocarbon liquid, such as diesel oil, a soluble hydrocarbon liquid surfactant, as hereinafter defined, and the fine particle size cement of this invention. The preferred order of blending of the ingredients involves adding the correct quantity of surfactant to the hydrocarbon liquid with thorough mixing and then slowly adding the cement to the oil/surfactant blend with continued mixing to obtain the desired slurry of uniform consistency.

The surfactant useful herein which is a solution consisting of an aromatic sulfonic acid or a salt thereof dissolved in a low molecular weight alcohol, is mixed with a hydrocarbon liquid, such as diesel oil, in an amount in the range of from about 10 to about 25 and preferably about 20 gallons of surfactant solution per 1000 gallons of hydrocarbon liquid. The quantity of hydrocarbon liquid to be utilized is dependent upon the quantity of fine particle size cement employed and is in the range of from about 6 to about 10 gallons of hydrocarbon liquid per 100 pounds of fine cement. The amount of hydrocarbon liquid and surfactant utilized, within the scope of the above proportions, will determine the density of the resulting cement/hydrocarbon slurry wherein the slurry density is inversely proportional to the quantity of liquid. Accordingly, 4400 pounds of fine cement, 5.5 gallons of a preferred surfactant and 275 gallons of diesel will produce a slurry having a density of about 14.1 pounds per gallon while 4400 pounds of fine cement, 8.0 gallons of surfactant and 400 gallons of diesel will produce a slurry having a density of about 12.5 pounds per gallon.

The low viscosity, non-volatile hydrocarbon liquid useful herein can be an aliphatic compound, such as hexane, heptane or octane, an aromatic compound such as benzene, toluene or xylene and mixtures thereof such as kerosene, diesel oil, mineral oil and lubricating oil.

As mentioned previously, the surfactant includes, as an essential component, an aromatic sulfonic acid or a salt thereof. This component is sometimes referred to herein as the organic acid or salt component. The organic acid component is a compound identified by the formulas:

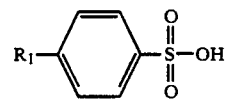

and

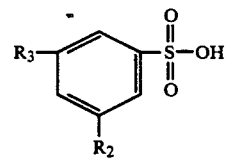

wherein $R_1$ is selected from linear alkyl groups having 12 carbon atoms or 16 to 24 carbon atoms and $R_2$ and $R_3$ are linear alkyl groups containing 12 carbon atoms.

Compounds within the scope of formulas (1) and (2) known to be useful herein are the acids themselves as well as the alkaline earth metal salts thereof. The preferred such salts are the calcium salts and the magnesium salts.

The preferred organic acid component of the surfactant of this invention is selected from the group consisting of calcium dodecylbenzene sulfonate, calcium didodecylbenzene sulfonate and calcium salts of benzenesulfonic acid having linear alkyl groups containing 16 to 24 carbon atoms. The most preferred is calcium dodecylbenzene sulfonate.

In a broader context the organic acid component is thought to include linear alkyl aromatic sulfonic acid, linear alkyl aromatic phosphonic acid, linear alkyl aromatic sulfonates and linear alkyl aromatic phosphonates having at least one linear alkyl group containing at least eight carbon atoms.

The low molecular weight alcohol solvent component of the surfactant solution is selected from aliphatic alcohols having in the range of from 1 to 5 carbon atoms wherein isopropanol is preferred.

The alcohol is present in the surfactant in the range of from about 20 to about 40 and preferably about 25 parts alcohol per 100 parts by volume of the surfactant solution.

The organic acid or salt component of the surfactant solution is present in the surfactant in the range of from about 60 to about 80 and preferably about 75 parts acid or salt per 100 parts by volume of the surfactant solution.

The surfactants known to be useful herein were identified by means of the following screening tests. The test results are provided in Table A, below.

Evaluation procedure for screening surfactants:

Slurries were prepared by mixing 50 grams of small particle size cement that had been vacuum oven dried with a solution of 25 ml of water-free kerosene and 0.5 ml of a compound as shown in Table A. Solubility of the compound in the kerosene was noted and the dispersibility of the cement in the solution was observed and recorded. To this slurry was added 2.5 ml of fresh water. The slurry was then shaken vigorously for 2 minutes. At this time, the slurry was checked for pourability and pumpability and the results recorded. If applicable, the samples were checked again at 1 hour to determine gel strength attainment.

Those compounds which were not soluble in the kerosene and were neither a free acid nor a calcium or magnesium salt were washed with both a 10% $CaCl_2$ and a 50% CaCl₂ solution through a separatory funnel in order to produce calcium salts.

TABLE A

| Compound (Calcium salts) | Soluble In Kerosene | Dispersibility | Remains Pourable After 2 Minutes | Set After 1 Hour |
|---|---|---|---|---|
| Dinonyl-naphthalene sulfonic acid | passed | passed | failed | N/A |
| Dodecyl benzene sulfonate | passed | passed | passed | passed |
| Dodecyl ether ethoxylate sulfonate | failed | N/A | N/A | N/A |
| Aliphatic Phosphate Ester | passed | failed | N/A | N/A |
| Amine salt of naphthalene sulfonate | failed | N/A | N/A | N/A |
| diethyl naphthalene sulfonate | failed | N/A | N/A | N/A |
| Ammonium xylene sulfonate | failed | N/A | N/A | N/A |
| oleic acid and linoleic acid | passed | passed | passed | never set |
| Octyl and dioctyl phosphonate | failed | N/A | N/A | N/A |
| Sodium lauryl sulfonate | failed | N/A | N/A | N/A |
| Sodium alkylsulfate | failed | N/A | N/A | N/A |
| Magnesium sulfonate | passed | passed | failed | N/A |
| Calcium sulfonate | passed | failed | N/A | N/A |
| benzene sulfonic acid | passed | passed | failed | N/A |
| salt of sulfonic acid | passed | passed | failed | N/A |
| Overbased magnesium sulfonate | passed | passed | failed | N/A |
| Benzene sulfonic acid, C₁₆–C₂₄ alkyl derivatives | passed | passed | passed | passed |
| Amine salt of dinonyl naphthalene sulfonate | passed | passed | failed | N/A |
| Didodecyl benzene sulfonate | passed | passed | passed | passed |
| phosphoric acid | failed | N/A | N/A | N/A |
| Sulfate lauryl sulfate | failed | N/A | N/A | N/A |
| No compound | N/A | passed | passed | did not set in 72 hours |

The tables which follow provide information and data concerning the chemical, physical and performance properties of four hydraulic cements. Three of the cements are Portland cements and the fourth is a slag cement. One of the cements, identified as API Class A, due to particle size only, is not within the scope of this invention. The remaining three cements are within the scope of this invention.

Tables I and II provide physical data including specific surface, specific gravity, blending, and particle size analysis.

Tables III and IV provide performance data including compressive strength developed by stated slurries and penetration by stated slurries.

Tables V, VI, VII and VIII provide chemical content as determined by various different analysis techniques.

Table IX provides a chemical analysis of Portland type III cement as disclosed in U.S. Pat. No. 4,160,674 to Sawyer.

TABLE I

Comparison of Cements

| Hydraulic Cement Name | Type | Specific Surface Blaine, cm²/g | Specific Gravity g/cc | Slag Content Weight % |
|---|---|---|---|---|
| Ultra Fine | Portland | 13080 | 3.03 | 0 |
| API Class A | Portland | 3900 | 3.15 | 0 |
| White | Portland | 6460 | 3.03 | 0 |
| MC-500 | SLAG/Portland | 8960 | 2.95 | 80 to 90 |

TABLE II

Comparison of Cements

Particle Size Analysis*
Percent Passing Opening Microns

| Hydraulic Cement Name | Type | Maximum Microns | 45.0 | 40.4 | 20.4 | 17.8 | 17.0 | 15.0 | 9.6 | 9.2 | 7.8 | 6.4 | 5.3 | 5.2 | 4.5 | 3.5 | 3.0 | 2.8 | 2.2 | 1.2 |
|---|---|---|---|---|---|---|---|---|---|---|---|---|---|---|---|---|---|---|---|---|
| Ultra Fine | Portland | 11 | — | — | — | — | — | 100 | — | — | — | 90 | 79.1 | — | — | 50 | 33.4 | — | 20 | 6.7 |
| API Class A | Portland | 90 | 95 | 90 | — | 50 | — | 42.7 | — | — | 20 | — | 12.0 | — | — | — | 2.8 | — | — | 0.3 |
| White | Portlnad | 27 | — | 100 | 90 | — | — | 74 | — | 50 | — | — | 27 | — | 20 | — | 8.9 | — | — | 1.8 |
| MC-500 | SLAG/Portland | 17 | — | — | — | — | 100 | — | 90 | — | — | — | 56.5 | 50 | — | — | 22.3 | 20 | — | 5.4 |

*Malvern 3600 Ec Particle Size Analyzer

TABLE III

Comparison of Properties of Water Slurries of Hydraulic Cements

| Hydraulic Cement Name | Type | 1500 psi Compressive Strength After 24 hours Set @ 80° F. | | | 250[5] psi Compressive Strength After 24 hours Set @ 80° F. | | |
|---|---|---|---|---|---|---|---|
| | | lb Cement | lb Water | Density, lb/gal | lb Cement | lb Water | Density, lb/gal |
| Ultra Fine | Portland | 1.00 | 1.00 | 12.5 | 1.00 | 1.41 | 11.5 |
| API Class A | Portland | 1.00[1] | 0.576 | 14.7 | 1.00[4] | 0.99 | 12.3 |
| White | Portland | 1.00[2] | 0.80 | 13.2 | 1.00 | 1.17 | 12.0 |
| MC-500 | SLAG/Portland | —[3] | —[3] | —[3] | 1.00 | 1.00 | 12.5 |

Notes:
[1] 0.02 lb Bentonite, 0.01 lb Calcium Chloride
[2] 0.01 lb CFR-3 Dispersant
[3] For practical commercial usages a slurry of sufficiently high density cannot be made to produce the indicated compressive strength
[4] 0.39 lb Amorphous Silica, 0.39 lb Pozmix, 0.01 lb Calcium Chloride
[5] The Texas Railroad Commission requirement for primary cementing of surface casting

TABLE IV

Comparison of Properties of Water Slurries of Hydraulic Cements

| Hydraulic Cement Name | Type | Penetration of Slurry Through* A 2 Inch Long, 0.003 Inch Wide Slot Under Pressure of 90 psi | | | Cement lb | Water lb | Slurry[2] Density lb/gal | Strength, 24 Hours psi |
|---|---|---|---|---|---|---|---|---|
| | | Volume, cc | Time, Sec | Percent of Slurry | | | | |
| Ultra Fine | Portland | 10 | 2 | 7.1 | 1.00 | 1.41 | 11.5 | 250 |
| API Class A | Portland | 0.7 | 2 | 0.5 | 1.00 | 0.461 | 15.6[3] | 1900 |
| White | Portland | 3 | 2 | 2.2 | 1.00[1] | 1.00 | 12.5 | 750 |
| MC-500 | SLAG/Portland | 8.6 | 2 | 6.1 | 1.00 | 1.00 | 12.5 | 250 |

Notes:
[1] 0.01 lb CFR-3 Dispersant
[2] The selected densities are considered to be commercial standards based on water required to avoid excessive settling of solids - i.e. water separation. Water requirements are a function of cement fineness.
[3] Density of 12.5 is not commercially practical due to excessive settling
*Note:
Penetration tests were conducted by pouring 140 ccs of slurry into a cell containing a hardened steel plate on the bottom. A slot of 0.003 inches in width was placed across the entire 2 inch diameter of the plate. A pressure of 90 psi was applied to force the cement slurry through the slot. The percentages are by volume of the total slurry placed in the cell. For example, since 140 ccs of the Ultra Fine was placed in the cell, 7.1%, or 10 ccs, passed through the slot before bridging off.

TABLE V

X-ray Fluorescence Analysis of Hydraulic Cement Material

| Oxide Components | Hydraulic Cement Name Percent | | | |
|---|---|---|---|---|
| | MC-500 | Ultra Fine | API Class A | White |
| $Na_2O$ | 0.30 | 0.17 | 0.37 | 0.37 |
| $MgO$ | 3.40 | 1.10 | 1.30 | 2.40 |
| $Al_2O_3$ | 11.29 | 4.26 | 4.32 | 4.01 |
| $SiO_2$ | 29.54 | 17.80 | 20.86 | 21.08 |
| $SO_3$ | 2.15 | 7.85 | 2.98 | 3.40 |
| $K_2O$ | 0.41 | 0.95 | 0.93 | 0.27 |
| $CaO$ | 50.79 | 62.12 | 65.29 | 65.64 |
| $TiO_2$ | 0.49 | 0.18 | 0.23 | 0.12 |
| $Cr_2O_3$ | 0.0 | 0.0 | 0.0 | 0.0 |
| $MnO$ | 0.38 | 0.03 | 0.03 | 0.02 |
| $Fe_2O_3$ | 1.16 | 2.30 | 2.35 | 0.29 |
| $ZnO$ | 0.01 | 0.01 | 0.02 | 0.01 |
| $SrO$ | 0.08 | 0.11 | 0.07 | 0.04 |
| Loss On Ignition | 0.0 | 3.12 | 1.25 | 2.35 |

TABLE VI

Cement Compound Concentration, Percent By Bogue Calculation From Oxide Components in Table V

| Compound | MC-500 | Ultra Fine | API Class A | White |
|---|---|---|---|---|
| Free Lime | 0.4 | 0.7 | 0.58 | 3.67 |
| $C_3S$ | * | 62.56 | 64.89 | 55.58 |
| $C_2S$ | * | 5.47 | 11.6 | 19.96 |
| $C_3A$ | * | 7.63 | 7.57 | 10.39 |
| $C_4AF$ | * | 7.22 | 7.23 | 0.89 |
| $CaSO_4$ ($C\bar{S}$) | * | 13.78 | 5.12 | 5.92 |

*Cannot Calculate due to excess of Al and Si

TABLE VII

Quantitative X-Ray Diffraction Analysis Hydraulic Cement Materials

| Extract Component | Crystalline Compound% | Hydraulic Cement Name | | | |
|---|---|---|---|---|---|
| | | MC-500 | Ultra Fine % | API Class A % | White % |
| Silicates | | * | 74.0 | 79.9 | 81.7 |
| | $C_3S$ | * | 41.5 | 52.0 | 55.6 |
| | $C_2S$ | * | 32.5 | 27.9 | 26.1 |
| Sulfates | | * | 10.6 | 4.6 | 4.8 |
| | $CaSO_4 \cdot 2H_2O$ | * | 4.7 | 0.4 | 1.9 |
| | $CaSO_4 \cdot \frac{1}{2}H_2O$ | * | 2.5 | 1.6 | 3.4 |
| | Syngenite | * | 3.4 | 2.6 | — |
| Alumino Ferrites | | * | 15.4 | 15.5 | 13.5 |
| | $C_3A$[1] | * | 7.7 | 4.6 | 8.5 |
| | $C_3A$[2] | * | 1.1 | 2.8 | *4.0 |
| | $C_4AF$ | * | 6.4 | 7.8 | — |
| | Periclase | * | 0.1 | 0.2 | 0.8 |
| | Dolomite | * | 0.1 | 0.1 | — |
| | Quartz | * | — | — | 0.2 |

*Compounds are primarily non-Crystalline and therefore cannot be examined quantitatively
[1] Cubic Crystalline form
[2] Orthorhombic Crystalline form

TABLE VIII

Miscellaneous Information

| Measurement | Hydraulic Cement Name, Percent | | | |
|---|---|---|---|---|
| | MC-500 | Ultra-Fine | API Class A | White |
| Insoluble Residue | 0.24 | 0.09 | 0.16 | 0.41 |
| Total Alkali | 0.57 | 0.80 | 0.98 | 0.55 |

TABLE VIII-continued

| Measurement | Miscellaneous Information Hydraulic Cement Name, Percent | | | |
|---|---|---|---|---|
| | MC-500 | Ultra-Fine | API Class A | White |
| Total H₂O Sol. Alkali | 0.56 | 0.05 | 0.43 | 0.17 |
| Differential Thermal Analysis | | | | |
| Gypsum | 0.0 | 5.44 | 0.30 | 0.85 |
| Hemihydrate | 1.04 | 0.44 | 0.17 | 0.88 |

Referring now to Tables I, II, III, IV, V, VI, VII, and VIII set out above, there is presented, in convenient tabular form, a comparison of various properties of four different cementitious materials each of which exhibit hydraulic activity. "Hydraulic activity" and "reactivity" as used herein mean the chemical nature of a material to set and harden, upon being mixed with water, without contact with the atmosphere (e.g. the ability to harden under water) due to the interaction of the constituents of the material rather than by evaporation of the water. The term "hydraulic cement" as used herein means all inorganic cementitious materials of known type which comprise compounds of calcium, aluminum, silicon, oxygen and/or sulfur which exhibit "hydraulic activity", that is, which set solid and harden in the presence of water. Cements of this type include common Portland cements, fast setting or extra fast setting, sulfate resistant cements, modified cements, alumina cements, high alumina cements, calcium aluminate cements, and cements which contain secondary components such as fly ash, pozzalona and the like. See for example Roca, et al., U.S. Pat. No. 4,681,634. There are in existence inorganic cementitious materials other than those exemplified in Tables I-VIII which exhibit hydraulic activity, but this invention is preferably limited to the types included in Tables I-VIII.

Accordingly, Portland cement, one of the materials listed in the Tables is made by sintering (thermally treating) a ground mixture of raw materials one of which is usually composed mainly of calcium carbonate (as limestone) and another of which is usually composed mainly of aluminum silicates (as clay or shale) to obtain a mixture of lime, aluminum oxide, silicon dioxide and ferric oxide. During the sintering process chemical reactions occur which produce nodules, called clinkers, which are primarily composed of mixed calcium silicates ($C_2S$ and $C_3S$), calcium aluminates ($C_3A$) and calcium aluminoferrites ($C_4AF$) all of which compounds contribute to the hydraulic activity of Portland cement. See for example Braunauer, U.S. Pat. No. 3,689,294; Buchet, et al., U.S. Pat. No. 4,054,460; and Gartner, U.S. Pat. No. 4,619,702. An example of a chemical analysis of Portland cement clinker is provided by Skvàra, U.S. Pat. No. 4,551,176 as follows:

| Component | Weight Percent |
|---|---|
| $SiO_2$ | 20-21.9 |
| CaO | 62.2-67.3 |
| $Al_2O_3$ | 4.7-6.3 |
| $Fe_2O_3$ | 2.4-4.5 |
| MgO | 1.3-3.3 |
| $SO_3$ | 0.16-1.05 |
| $Na_2O + K_2O$ | 0.81-0.95 |

After sintering, the clinkers are ground together with additives, including for example a quantity of calcium sulfate dihydrate (gypsum) to control set time, to a specific surface area, sometimes called Blaine Fineness, of as high as 10,000 cm²/gram or more, but ordinarily the grinding is sufficient to produce a specific surface area in the range of from about 2500 to 5000 cm²/gram with 3000 to 4500 cm²/gram being the usual Blaine Fineness range for Portland cement. See for example Gartner, U.S. Pat. No. 4,619,702; Miyoshi, et al., U.S. Pat. No. 4,443,260; Buchet, et al., U.S. Pat. No. 4,054,460; and Braunauer, U.S. Pat. No. 3,689,294.

Portland cements are classified by the American Society of Testing Materials (ASTM) into five major types identified by Roman Numerals I, II, III, IV and V and by the American Petroleum Institute into at least 9 categories identified by the letters A, B, C, D, E, F, G, H and J. The classifications are based on chemical composition and physical properties.

Sawyer in U.S. Pat. No. 4,160,674 specifically discloses a Type III Portland cement exhibiting high early compressive strength wherein: substantially all particles in the cement are of a size of about 20 microns and smaller; the Blaine Fineness is about 8990 cm²/gram; and the specific gravity is 3.00. Sawyer provides an analysis of the Type III material, which is referred to as the "fine product". The analysis is set out in Table IX below.

TABLE IX

| Chemical Analysis-Fine Product | | Compound Composition | |
|---|---|---|---|
| $SiO_2$ | 19.61 | $C_3S$ | 46.58 |
| $Al_2O_3$ | 4.93 | $C_2S$ | 21.10 |
| $Fe_2O_3$ | 2.50 | $C_3A$ | 8.83 |
| CaO | 61.26 | $C_4AF$ | 7.61 |
| MgO | 1.42 | $CaSO_4$ | 10.18 |
| $SO_3$ | 5.99 | | |
| Loss | 3.12 | | |
| Total | 98.83 | | |
| Lime Factor | 2.45 | | |
| Silica Ratio | 2.64 | | |
| A/F | 1.97 | | |
| Insol Residue | 0.53 | | |
| Free CaO | 1.26 | | |
| $Na_2O$ | 0.11 | | |
| $K_2O$ | 1.06 | | |
| Total alk. | 0.81 | | |

Galer, et al., in U.S. Pat. No. 4,350,533 provides abbreviations for chemical formulas of cement compounds in accordance with general practice in the cement industry as follows:

C represents calcium oxide (CaO)
A represents aluminum oxide ($Al_2O_3$)
F represents ferric oxide ($Fe_2O_3$)
M represents magnesium oxide (MgO)
S represents silicon dioxide ($SiO_2$)
K represents potassium oxide ($K_2O$)
N represents sodium oxide ($Na_2O$)
H represents water ($H_2O$)
$\bar{S}$ represents sulfur trioxide ($SO_3$)
$\bar{C}$ represents carbon dioxide ($CO_2$)

Accordingly, based upon the above abbreviations the chemical composition of the Type III Portland cement disclosed by Sawyer (Table IX above) is:

| $C_3S:3CaO.SiO_2$ | 46.58 |
|---|---|
| $C_2S:2CaO.SiO_2$ | 21.10 |
| $C_3A:3CaO.Al_2O_3$ | 8.83 |
| $C_4AF:4CaO.Al_2O_3.Fe_2O_3$ | 7.61 |
| $C\bar{S}:CaSO_4$ | 10.18 |

Tables I–VIII also include a hydraulic cement material identified as "Slag/Portland" which is a combination of Portland cement and slag.

"Slag", as used herein, means a granulated, blast-furnace, by-product formed in the production of cast iron and is broadly comprised of the oxidized impurities found in iron ore.

During the operation of a blast furnace to remove iron from iron ore a molten waste product is formed. By preventing this molten product from crystallizing, and thereby losing its energy of cystallization, a super-cooled liquid or non-crystalline glassy material can be formed thus retaining the energy of crystallization. This non-crystalline, glassy material, which has also been described as a vitreous substance free from crystalline substances as determined by X-ray diffraction analysis, is said to be capable of exhibiting hydraulic activity upon being reduced in size by grinding from a particle size of 1 to 5 millimeters to a fine particle size in the range of from about 1 to about 100 microns. Many commentators, including Clarke in U.S. Pat. No. 4,761,183 and Forss in U.S. Pat. No. 4,306,912, state that the glass content of the material, in order to exhibit latent hydraulic activity, must be high and preferably above about 95 percent.

Crystallization of the molten blast-furnace waste product can be prevented and the super cooled liquid or glass can be formed by rapidly chilling the molten waste. This rapid chilling can be effected by spraying the molten waste with streams of water which operation causes rapid solidification and formation of a water slurry of small, glassy, sand-like particles. The slurry is then thermally dried to remove substantially all moisture to thereby produce a dry blend of coarse particles. This dry blend of particles, having a particle size in the range of 1 to 5 millimeters, is then ground to reduce particle size to values in the range of from 1 to about 100 microns and preferably less than abut 325 mesh (45 microns) to produce the granulated, blast-furnace by-product herein defined as "Slag". See, for example, Miyoshi, et al., U.S. Pat. No. 4,443,260; Allemand, et al., U.S. Pat. No. 3,809,665; Buchet, et al., U.S. Pat. No. 4,054,460; Gee, et al., U.S. Pat. No. 4,242,142; Clarke, U.S. Pat. No. 4,761,183; and Forss, U.S. Pat. No. 4,306,912.

Clarke '183 and Miyoshi, et al., in U.S. Pat. No. 4,306,910 disclose the following analysis, said by them to be representative of the usual ranges of chemical content of slag.

| Component | Weight Percent | |
|---|---|---|
| | Clarke | Miyoshi |
| $SiO_2$ | 30–40 | 30–35 |
| $Al_2O_3$ | 8–18 | 13–18 |
| $Fe_2O_3$ | — | 0.5–1.0 |
| CaO | 35–50 | 38–45 |
| MgO | 0–15 | 3–6 |
| $SO_3$ | — | — |
| FeO | 0–1 | — |
| S | 0–2 | 0.5–1.0 |
| $Mn_2O_3$ | 0–2 | — |
| MnO | — | 0.5–1.5 |
| $TiO_2$ | 0 | 0.5–1.0 |

Clarke further states that the density of slag is considered to be 2.92 grams per cubic centimeter.

Another analysis of slag is provided by Yamaguchi, et al., in U.S. Pat. No. 3,904,568 as follows:

| Component | Weight Percent |
|---|---|
| $SiO_2$ | 34.9 |
| $Al_2O_3 + Fe_2O_3$ | 16.8 |
| CaO | 41.1 |
| MgO | 5.5 |

Miyoshi, et al., '910 state that the hydraulic activity of slag is low if the particle size of the slag is in the range of 1 to 5 millimeters and accordingly, suggest that the particle size of slag should be reduced by grinding to a value of at least about 5 microns or less; and still further state that the slag, by itself, even after grinding has no or very low hydraulic activity and thus requires activation or stimulation such as by the addition thereto of slaked lime ($CaO.H_2O$). Other additives to stimulate or activate the hydraulic activity of Slag include sodium hydroxide, sodium sulfate, sodium carbonate, sodium silicate, potassium sulfate and Portland cement. See for example Clarke, U.S. Pat. No. 4,761,183 and Clarke, U.S. Pat. No. 4,897,119.

According to Forss in U.S. Pat. No. 4,306,912 grinding slag to a high specific surface, e.g. in the range of from about 4000 to about 8000 $cm^2$/gram, can increase the hydraulic activity and hardening rate of the material. Forss also states that it is known that grinding cement clinker beyond a certain limit is not beneficial because additional fineness hardly improves the properties of hardening and strength. On the other hand Birchall, et al., in U.S. Pat. No. 4,353,747 state that the strength of Portland cement can be improved by reducing the weight average mean particle size of Portland cement to a value of less than 20 microns.

The various methods for conducting cementing operations normally associated with wells in subterranean hydrocarbon producing formations are generally known. These basic techniques with changes, as required, can be employed to place the fine particle size cement of this invention in position to solve the various problems addressed herein. A technique which can be used for terminating the flow of water from a zone in a subterranean formation is outlined in Procedure A below.

Procedure A

Method for Terminating the Flow of Water From a Zone in a Subterranean Formation 1. Locate the zone within the subterranean formation from which water is being produced. This task may be performed by using known methods of identifying casing perforations through which water is flowing. The water may be flowing from a fracture or from a high permeability portion in the zone.

2. Isolate the identified perforations by placing a bridge plug in the casing below the perforations and a packer in the casing above the perforations to thereby define a space within the casing between the bridge plug and packer which is in communication with the zone via the perforations; establish communication with the wellhead via tubing from the wellhead to the packer.

3. Introduce a spacer fluid such as diesel oil into the zone via the tubing and perforations.

4. Introduce a slurry of the cement composition of the invention in a hydrocarbon liquid together with the surfactant described above into the zone. The cement must be of sufficient volume to form a plug in the zone to prevent passage of fluid therethrough. Introduction of the cement is preferably effected at a pressure less than the pressure required to fracture the zone.

5. Introduce an overflush fluid such as diesel oil into the zone via the tubing and perforations to help in the introduction of the hydrocarbon-cement slurry into the zone.

6. Shut well in for 24 hours, preferably under pressure, to permit the cement to hydrate with formation water in zone and harden. Remove the tubing, the packer and the bridge plug from the well.

Having described the invention that which is claimed is:

1. A method for terminating the flow of water from a portion of a subterranean formation into a wellbore said method comprising the steps of:

placing within said wellbore adjacent said portion a volume of a slurry of hydraulic cement, said volume being in an amount at least sufficient to saturate said portion;

permitting said volume to penetrate into said portion; and maintaining said slurry in said portion for a time sufficient to enable said slurry to form a rigid mass of cement in said portion;

wherein said slurry consists essentially of a mixture of said hydraulic cement, a hydrocarbon liquid and a liquid surfactant soluble in said hydrocarbon liquid, the particle size of said hydraulic cement is not greater than about 30 microns, the Blaine Fineness of said hydraulic cement is no less than about 6000 cm$^2$/gram, and said hydraulic cement is Portland cement or slag or mixtures thereof; and further wherein said liquid surfactant includes as an essential component an alkyl aromatic sulfonic acid within the scope of the formulas

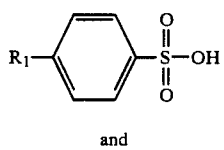

(1)

and

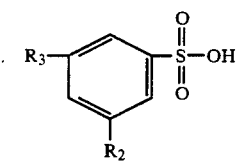

(2)

or the alkaline earth metal salts thereof wherein $R_1$ is selected from linear alkyl groups having 12 carbon atoms or 16 to 24 carbon atoms and $R_2$ and $R_3$ are linear alkyl groups containing 12 carbon atoms.

2. The method of claim 1 wherein said portion has an effective permeability as low as about 3000 to 5000 millidarcies.

3. The method of claim 1 wherein said hydrocarbon liquid is present in said slurry in an amount in the range of from about 6 to about 10 gallons per 100 pounds of said cement.

4. The method of claim 3 wherein said liquid surfactant soluble in said hydrocarbon liquid is present in said slurry in an amount in the range of from about 10 to about 25 gallons surfactant per 1000 gallons of hydrocarbon liquid.

5. The method of claim 4 wherein said liquid surfactant consists of a solution of said essential component dissolved in a low molecular weight alcohol wherein said essential component is present in said solution in the range of from about 60 to about 80 parts per 100 parts by volume of said liquid surfactant.

6. The method of claim 5 wherein said essential component is selected from the group consisting of calcium dodecylbenzene sulfonate, calcium didodecylbenzene sulfonate and calcium salts of benzenesulfonic acid having linear alkyl groups containing 16 to 24 carbon atoms.

7. The method of claim 6 wherein said cement is Portland cement.

8. The method of claim 7 wherein said hydrocarbon liquid is diesel oil and said surfactant consists of calcium dodecylbenzene sulfonate and isopropanol.

9. The method of claim 8 wherein said volume of said slurry is permitted to penetrate into said portion by applying pressure against said slurry in said wellbore.

10. The method of claim 6 wherein 90 percent of said particles have a diameter not greater than about 25 microns, 50 percent of said particles have a diameter not greater than about 10 microns and 20 percent of said particles have a particle size not greater than about 5 microns.

11. The method of claim 10 wherein said volume of said slurry is permitted to penetrate into said portion by applying pressure against said slurry in said wellbore.

12. The method of claim 11 wherein said hydraulic cement is Portland cement.

13. The method of claim 12 wherein said particle size of said cement is not greater than about 17 microns and said Blaine Fineness is no less than about 7000 cm$^2$/gram.

* * * * *